United States Patent
Hsieh et al.

(10) Patent No.: US 12,307,095 B2
(45) Date of Patent: May 20, 2025

(54) ELECTRONIC SYSTEM AND METHOD FOR CONTROLLING BURST LENGTH TO ACCESS MEMORY DEVICE OF ELECTRONIC SYSTEM

(71) Applicant: MEDIATEK INC., Hsinchu (TW)

(72) Inventors: Bo-Wei Hsieh, Hsinchu (TW);
Chen-Chieh Wang, Hsinchu (TW);
Szu-Ying Cheng, Hsinchu (TW);
Jou-Ling Chen, Hsinchu (TW)

(73) Assignee: MEDIATEK INC., Hsinchu (TW)

( * ) Notice: Subject to any disclaimer, the term of this patent is extended or adjusted under 35 U.S.C. 154(b) by 76 days.

(21) Appl. No.: 18/170,096

(22) Filed: Feb. 16, 2023

(65) Prior Publication Data
US 2023/0289063 A1 Sep. 14, 2023

Related U.S. Application Data

(60) Provisional application No. 63/319,403, filed on Mar. 14, 2022.

(51) Int. Cl.
*G06F 3/06* (2006.01)
*G06F 13/16* (2006.01)

(52) U.S. Cl.
CPC .......... *G06F 3/0613* (2013.01); *G06F 3/0659* (2013.01); *G06F 3/0673* (2013.01); *G06F 13/1689* (2013.01)

(58) Field of Classification Search
CPC ..... G06F 3/0613; G06F 3/0659; G06F 3/0673
See application file for complete search history.

(56) References Cited

U.S. PATENT DOCUMENTS

| | | | |
|---|---|---|---|
| 10,504,591 B2 | 12/2019 | Qawami | |
| 2010/0241782 A1* | 9/2010 | Maddali | G06F 13/1694 |
| | | | 711/E12.082 |

(Continued)

FOREIGN PATENT DOCUMENTS

| | | |
|---|---|---|
| JP | 2021-157295 A | 10/2021 |
| TW | 201626234 A | 7/2016 |
| WO | 2004/008329 A1 | 1/2004 |

OTHER PUBLICATIONS

Extended European Search Report dated Jul. 14, 2023, issued in application No. EP 23160478.6.

(Continued)

*Primary Examiner* — Gurtej Bansal
(74) *Attorney, Agent, or Firm* — McClure, Qualey & Rodack, LLP

(57) ABSTRACT

An electronic system is provided. A memory device includes a plurality of bank groups. A controller is coupled to the memory device and includes a request queue. The request queue is configured to store a plurality of requests. When the requests correspond to the different bank groups, the controller is configured to access data of the memory device according to a plurality of long burst commands corresponding to the requests. When the requests correspond to the same bank group, the controller is configured to access the data of the memory device according to a plurality of short burst commands corresponding to the requests. The short burst commands correspond to a short burst length, and the long burst commands correspond to a long burst length. The long burst length is twice the short burst length. The memory device is a low-power double data rate synchronous dynamic random access memory.

18 Claims, 6 Drawing Sheets

(56) References Cited

U.S. PATENT DOCUMENTS

2016/0378366 A1* 12/2016 Tomishima .............. G11C 8/12
                                                                             711/154
2019/0196987 A1* 6/2019 Shen .................. G06F 13/1642
2020/0004420 A1 1/2020 Gans et al.

OTHER PUBLICATIONS

Chinese language office action dated Jun. 28, 2024, issued in application No. TW 112109144.

* cited by examiner

ELECTRONIC SYSTEM AND METHOD FOR CONTROLLING BURST LENGTH TO ACCESS MEMORY DEVICE OF ELECTRONIC SYSTEM

CROSS REFERENCE TO RELATED APPLICATIONS

This application claims the benefit of U.S. Provisional Application No. 63/319,403, filed Mar. 14, 2022, the entirety of which is incorporated by reference herein.

BACKGROUND OF THE INVENTION

Field of the Invention

The present invention relates to an electronic system, and, in particular, to a low-power memory device in an electronic system.

Description of the Related Art

Semiconductor memory device such as a low-power double data rate (LPDDR) synchronous dynamic random access memory (SDRAM) is widely used in mobile devices, such as mobile phones, portable computers, and the like. The LPDDR SDRAM is a high-speed synchronous SDRAM device internally configured with 1 channel, and may support multiple bank architectures to provide optimal access methods for varied system configurations. Furthermore, the burst length determined by data prefetch size depends on which bank architecture is used.

As operating systems (OS) become larger to support multitasking, the memory devices of the electronic systems (e.g., the mobile devices) need to efficiently operate at higher speed.

BRIEF SUMMARY OF THE INVENTION

An embodiment of the present invention provides an electronic system. The electronic system includes a memory device and a controller. The memory device includes a plurality of bank groups, and each of the bank groups includes a plurality of memory banks. The controller is coupled to the memory device and is configured to access the memory device with a data rate. The controller includes a request queue, and the request queue is configured to store a plurality of requests. The requests correspond to the different bank groups, the controller is configured to access the data of the memory device according to a plurality of long burst commands corresponding to the requests. When the requests correspond to the same bank group, the controller is configured to access the data of the memory device according to a plurality of short burst commands corresponding to the requests. The short burst commands correspond to a short burst length, and the long burst commands correspond to a long burst length. The long burst length is twice the short burst length.

In addition, an embodiment of the present invention provides a method for controlling burst length to access a memory device in an electronic system. A plurality of requests stored in a request queue of the electronic system are obtained. It is determined whether the requests correspond to a plurality of bank groups of the memory device, wherein each of the bank groups includes a plurality of memory banks. When the requests correspond to the different bank groups, the data of the memory device can be accessed according to a plurality of long burst commands that correspond to the requests. The data of the memory device is accessed according to a plurality of short burst commands corresponding to the request when the requests correspond to the same bank group. The short burst commands correspond to a short burst length, and the long burst commands correspond to a long burst length that is twice the short burst length.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is made for the purpose of illustrating the general principles of the invention and should not be taken in a limiting sense. The scope of the invention is best determined by reference to the appended claims.

Figure 1:
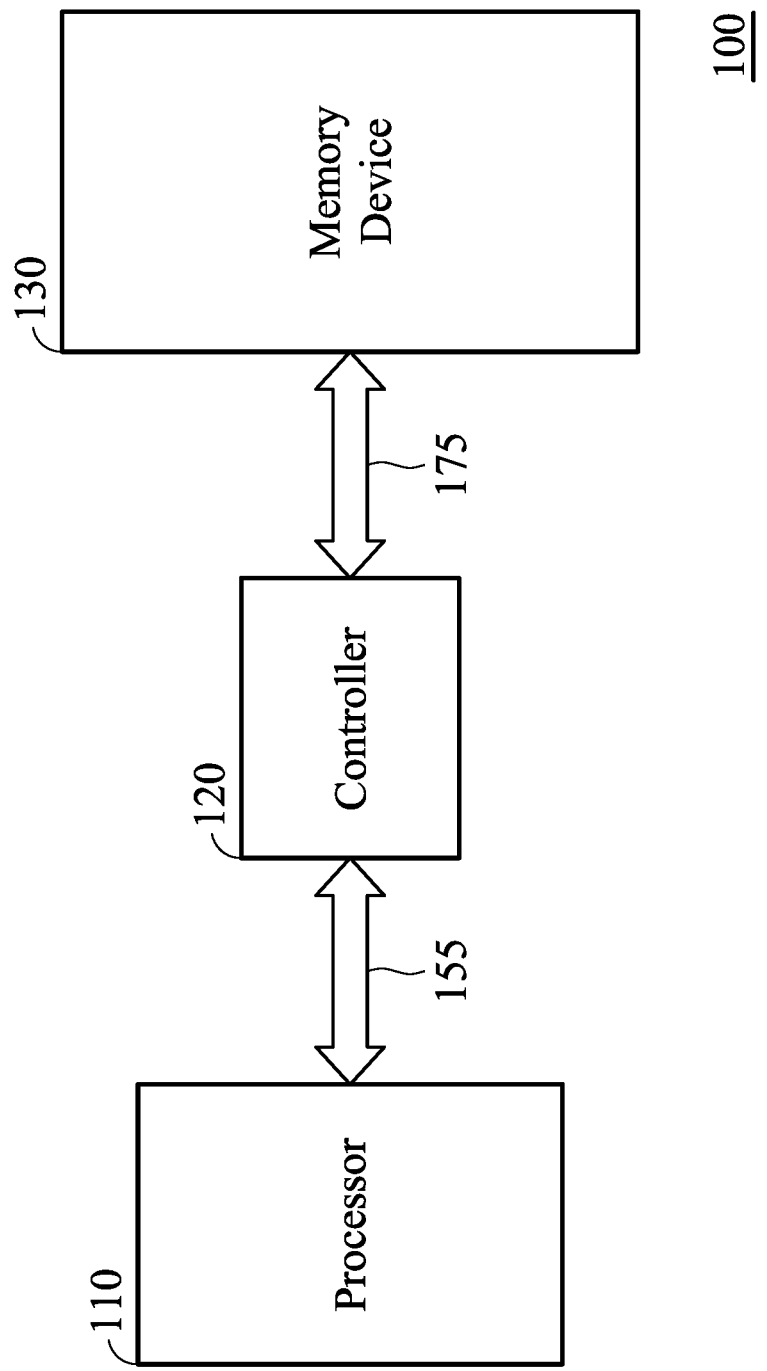
FIG. 1 shows an electronic system according to some embodiments of the invention.

FIG. 1 shows an electronic system 100 according to some embodiments of the invention. The electronic system 100 may be a mobile device, such as a mobile phone, a portable computer (e.g., a lap top computer, a tablet computer), a wearable device, and the like. The electronic system 100 includes a processor 110, a controller 120 and a memory device 130. The processor 110 is coupled to the controller 120 through an interconnect (e.g., a bus) 155, and the controller 120 is coupled to the memory device 130 through an interconnect (e.g., a bus) 175. The processor 110 is a requester in the electronic system 100 that needs to access data in the memory device 130 for performing various applications. In order to simplify the description, only the processor 110 is described as the requester in the electronic system 100, and other requesters (e.g., central processing unit (CPU), digital signal processor (DSP), graphic processing unit (GPU), etc.) that need to access the memory device 130 in the electronic system 100 will be omitted. The memory device 130 is a low power memory device that consumes less power for the electronic system 100. For example, the memory device 130 may be a low-power double data rate synchronous dynamic random access memory (LPDDR SDRAM).

In some embodiments, the memory device 130 may be a dynamic random access memory (DRAM), such as a double data rate synchronous dynamic random access memory (DDR SDRAM), a low power double data rate synchronous dynamic random access memory (LPDDR SDRAM), a graphics double data rate synchronous dynamic random access memory (GDDR SDRAM), a Rambus dynamic random access memory (RDRAM), and so on. In some embodiments, the electronic system 100 includes a plurality of memory devices 130, and the controller 120 is configured to control data exchange between the processor 110 (or various requesters) and the plurality of memory devices 130.

Figure 2:
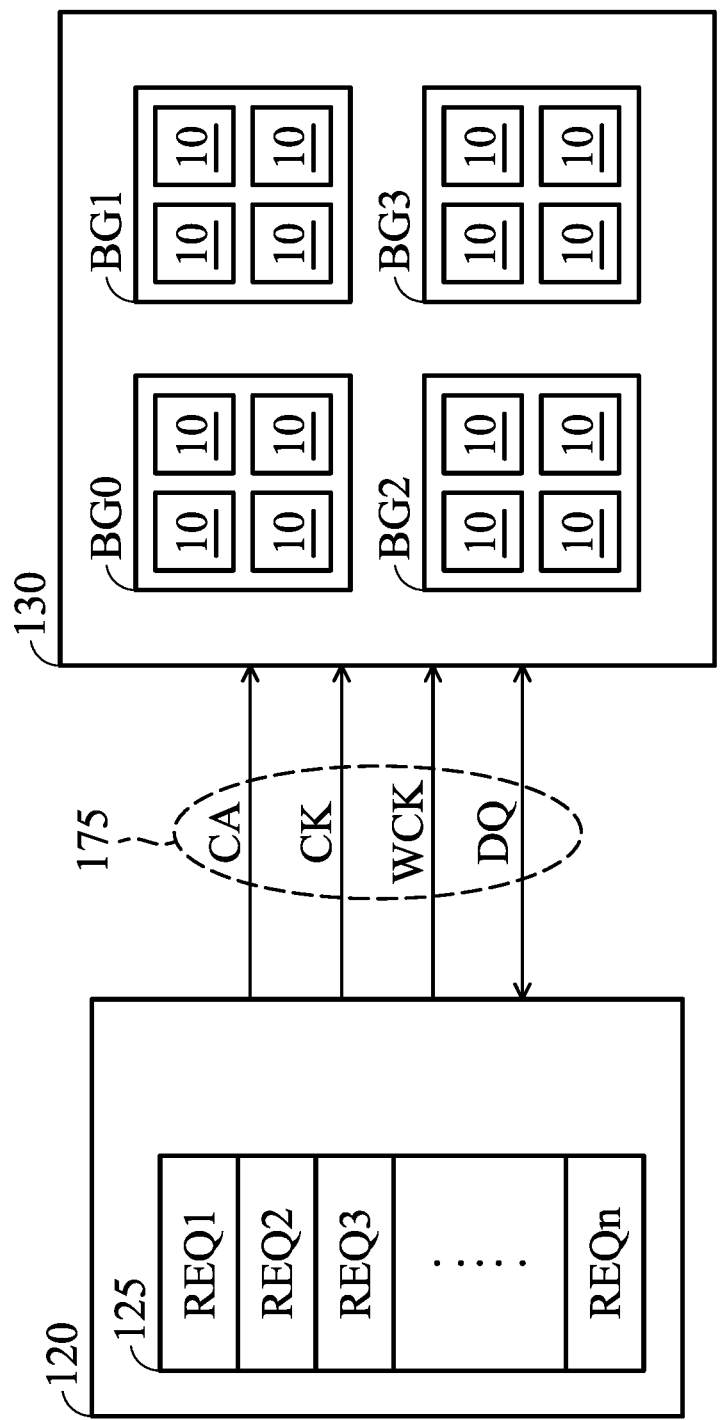
FIG. 2 shows a block diagram of the controller and the memory device of FIG. 1 according to some embodiments of the invention.

FIG. 2 shows a block diagram of the controller 120 and the memory device 130 of FIG. 1 according to some embodiments of the invention. The controller 120 includes a request queue 125, and the request queue 125 is configured to store the requests REQ1 through REQn from the processor 110 or other requesters (not shown) of the electronic system 100. In some embodiments, the requests REQ1 through REQn are provided by the same requester. In some embodiments, the requests REQ1 through REQn are provided by multiple requesters. In response to the requests REQ1 through REQn, the controller 120 is configured to access the memory device 130 with a data rate through the interconnect 175. The memory device 130 includes multiple bank groups BG0 through BG3. Each of the bank groups BG0 through BG3 includes multiple memory banks 10, e.g., 4 memory banks. According to the requests REQ1 through REQn queued in the request queue 125, the controller 120 is configured to dynamically control the burst length corresponding to the data and commands, so as to access the memory device 130 efficiently.

It should be noted that the number of bank groups and the number of memory banks shown in FIG. 2 are only an example, and the invention should not be limited thereto.

The interconnect 175 includes multiple transmission lines for transfer the command/address CA, the clock CK, the data DQ, and the data clock WCK. In order to simplify the description, FIG. 2 shows only a portion of the signals in the interconnect 175. The controller 120 is configured to provide the clock CK, the command/address CA and the data clock WCK to the memory device 130 through unidirectional transmission lines in the interconnect 175. In some embodiments, the frequency of the data clock WCK is twice that of the clock CK. Furthermore, the controller 120 is configured to provide the data DQ to the memory device 130 during write operations and receive the data DQ from the memory device 130 during read operations through bidirectional transmission lines in the interconnect 175. The command/address CA includes the command information corresponding to read or write operation, burst length and so on, and the address information corresponding to row address, column address, bank group and so on. The clock CK is configured to sample (or capture) the command/address CA for the memory device 130. In some embodiments, the clock CK is a pair of differential signals. The data clock WCK is used for capturing the data DQ during the write operations and outputting the data DQ during the read operations on the memory device 130. In some embodiments, the data clock WCK is a pair of differential signals.

Figure 3:
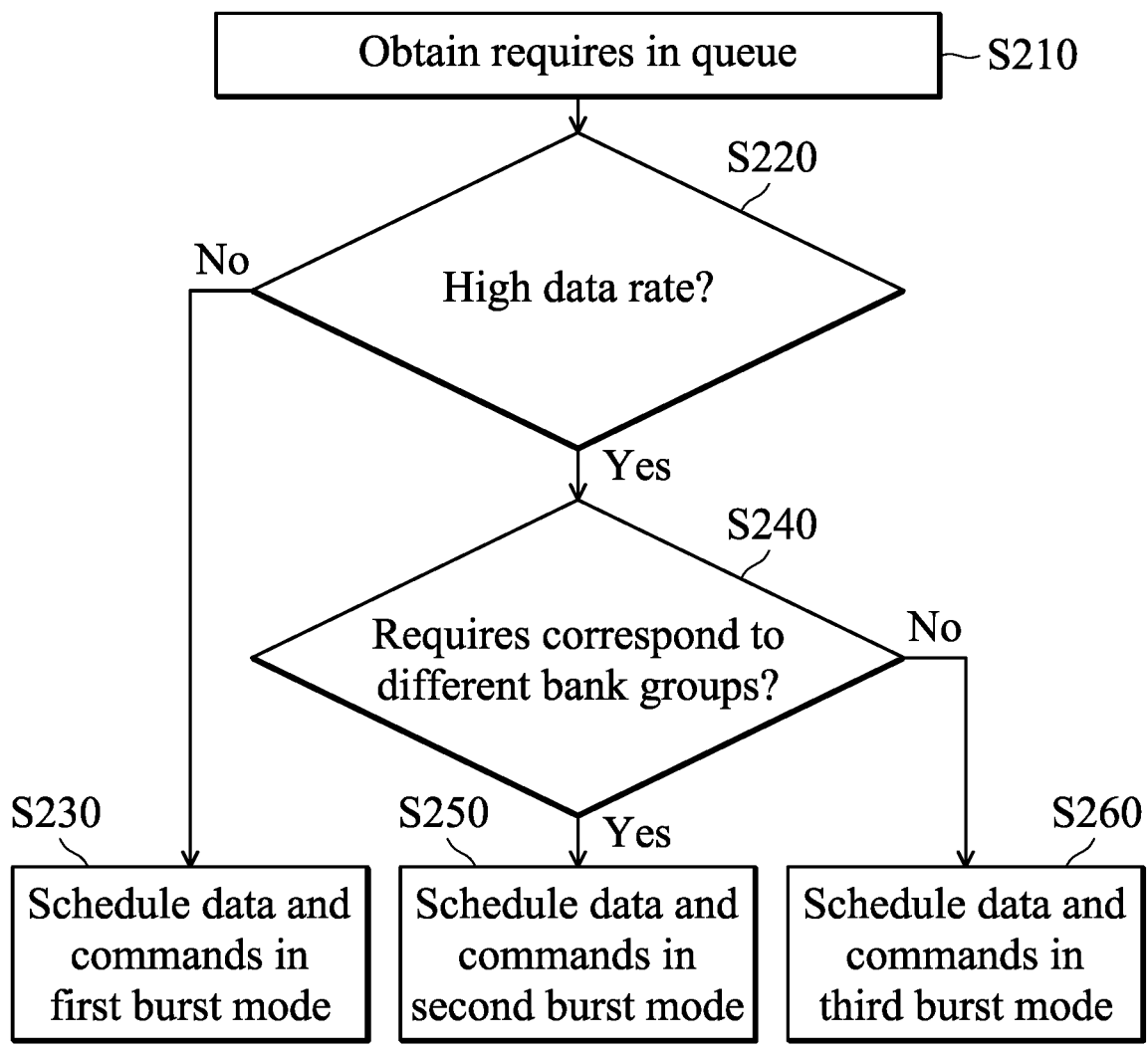
FIG. 3 shows a method for dynamically controlling burst length of commands to access the memory device according to some embodiments of the invention.

FIG. 3 shows a method 200 for dynamically controlling burst length of commands to access the memory device 130 according to some embodiments of the invention. When accessing the memory device 130 by the controller 120, the burst length of the memory device 130 is set (or programmed) by the access command (e.g., the read/write command) from the controller 120.

First, in step S210, the controller 120 is configured to obtain the requests REQ1 through REQn queued in the request queue 125. In some embodiments, the requests REQ1 through REQn are issued by the same requester (e.g., the processor 110 in FIG. 1). In some embodiments, the requests REQ1 through REQn are issued by two or more requesters (not shown). Next, in step S220, the controller 120 is configured to determine whether the memory device 130 is operating at a high data rate, i.e., the data rate of the memory device 130 is greater than a specific data rate (e.g., 4800 Nbps). If the memory device 130 is operating at a low data rate, e.g., the data rate of the memory device 130 is less than or equal to the specific data rate, the controller 120 is configured to schedule data and commands in a first burst mode (step S230), so as to issue the long burst commands (e.g., read/write command) to access data (e.g., read/write data) with a long burst length BLy in response to the requests REQ1 through REQn.

In the first burst mode, in response to one request, the corresponding data is transferred to or from the memory device 130 on successive clock cycles of the data clock WCK, and the corresponding command is issued to the memory device 130 on successive clock cycles of the clock CK. Furthermore, the clock cycles of the data clock WCK is determined according to the long burst length BLy. For example, the clock cycles of the data clock WCK is equal to the long burst length BLy. The operation of the first burst mode is described in FIG. 4A below.

In flowchart of the method 200, if the memory device 130 is operating at a high data rate (step S220), i.e., the data rate of the memory device 130 is greater than the specific data rate, the controller 120 is configured to determine whether the requests REQ1 through REQn correspond to different bank groups. i.e., multiple bank groups are accessed in response to the requests REQ1 through REQn (step S240).

If the requests REQ1 through REQn correspond to at least two bank groups (step S240), the controller 120 is configured to schedule data and commands in a second burst mode (step S250), so as to interleave two long burst commands to access data (e.g., read/write data) with a short burst length BLx in response to two of the requests REQ1 through REQn corresponding to the different bank groups.

In the second burst mode, in response to one request, the corresponding data is divided (or split) into two portions and separately transferred to or from the memory device 130 on successive clock cycles of the data clock WCK, and the corresponding command is transferred to the memory device 130 on successive clock cycles of the clock CK along with the portion of the divided data transferred first. Furthermore, the clock cycles of the data clock WCK corresponding to each portion of the divided data is determined according to the short burst length BLx. For example, the clock cycles of the data clock WCK corresponding to each portion of the divided data is equal to the short burst length BLx. A portion of the data corresponding to another request of another bank group is inserted between two portions of the divided data. The operation of the second burst mode is described in FIG. 4B below.

In flowchart of the method 200, if the requests REQ1 through REQn correspond to the same bank group (step S240), the controller 120 is configured to schedule data and commands in a third burst mode (step S260), so as to reorganize a long burst command as two short burst commands in response to the requests REQ1 through REQn, and then issue the two short burst commands to access data (e.g., read/write data) with the short burst length BLx.

In the third burst mode, in response to one request, the corresponding data is divided (or split) into two portions and separately transferred to or from the memory device 130 on successive clock cycles of the data clock WCK, and the corresponding short burst command is transferred to the memory device 130 on successive clock cycles of the clock CK along with each portion of the divided data. Furthermore, the clock cycles of the data clock WCK corresponding to each portion of the divided data is determined according to the short burst length BLx. For example, the clock cycles of the data clock WCK corresponding to each portion of the divided data is equal to the short burst length BLx. In the third burst mode, no data corresponding to another queued request in the request queue 125 is inserted between the portions of the divided data. The operation of the third burst mode is described in FIG. 4C below.

Figure 4A:
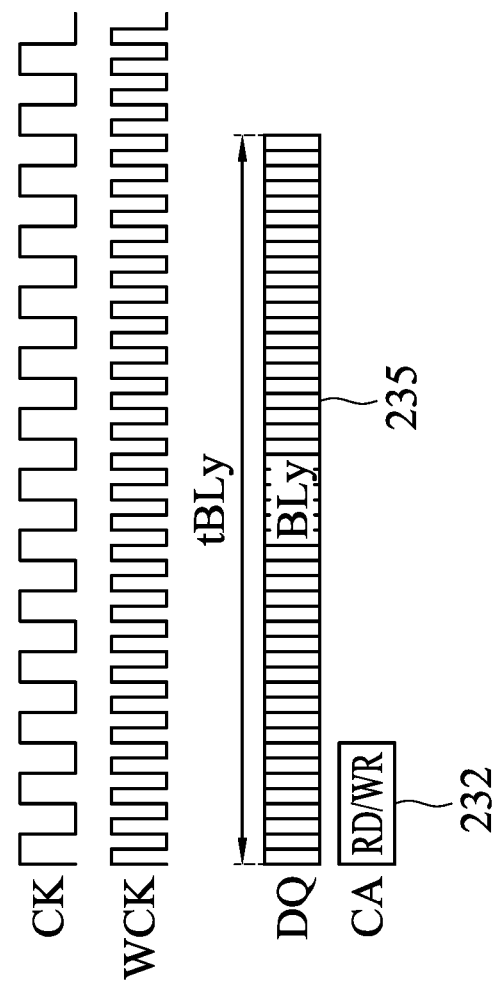
FIG. 4A shows a diagram illustrating the signals of the interconnect in the first burst mode according to some embodiments of the invention.

FIG. 4A shows a diagram illustrating the signals of the interconnect 175 in the first burst mode according to some embodiments of the invention. It is assumed that the controller 120 is configured to perform read/write operation in response to the request REQ1 of FIG. 2. When operating in the first burst mode, the controller 120 is configured to access the data of the memory device 130 with the long burst length BLy according to the read/write (RD/WR) command 232 in response to the request REQ1. Furthermore, the read/write command 232 is a long burst command, and the burst length of the memory device 130 is set by the read/write command 232. In the time interval tBLy, the read/write command 232 corresponding to the request REQ1 is issued to initiate a burst read/write operation for the memory device 130, and the data 235 is transferred to or from the memory device 130 on successive clock cycles of the data clock WCK. Furthermore, the clock cycles of the data clock WCK in the time interval tBLy is determined according to the long burst length BLy. In some embodiments, the clock cycles of the data clock WCK is 48, and the data 235 is 32 bytes of data in the data DQ.

Figure 4B:
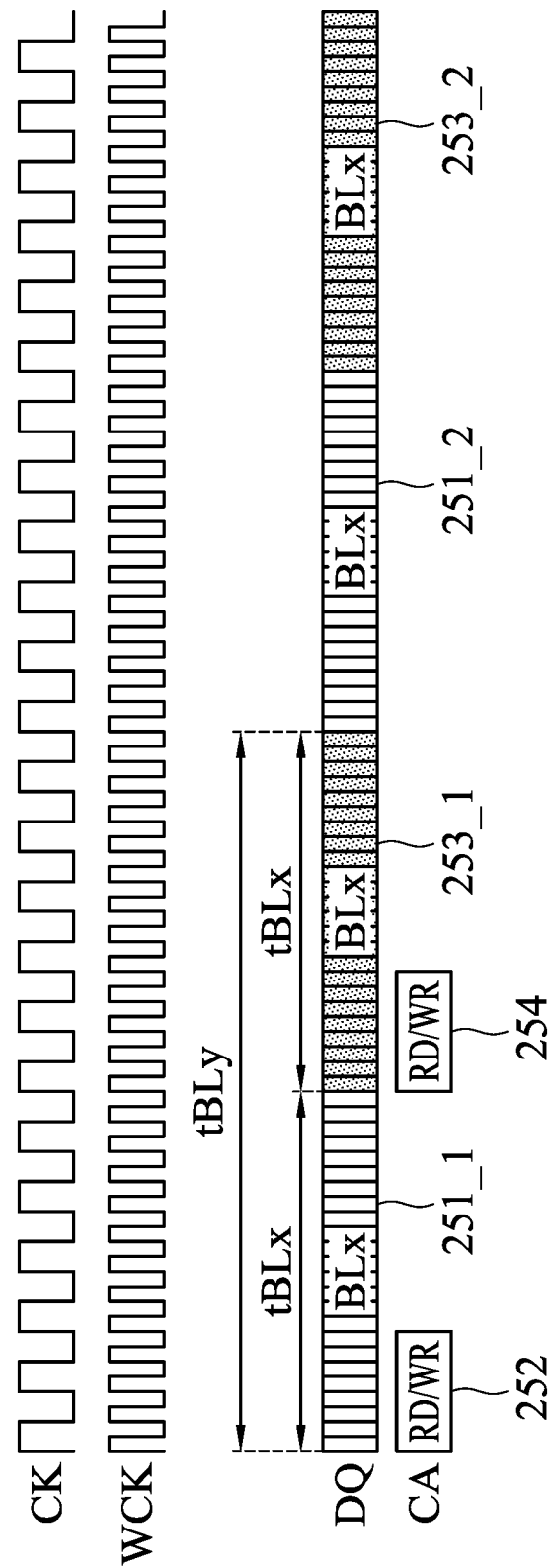
FIG. 4B shows a diagram illustrating the signals of the interconnect in the second burst mode according to some embodiments of the invention.

FIG. 4B shows a diagram illustrating the signals of the interconnect 175 in the second burst mode according to some embodiments of the invention. It is assumed that the controller 120 is configured to perform read/write operations in response to the requests REQ1 and REQ2 in FIG. 2, and the requests REQ1 and REQ2 correspond to the bank groups BG0 and BG1 of FIG. 2, respectively. When operating in the second burst mode, the controller 120 is configured to access the data of the memory device 130 with the short burst length BLx according to the read/write (RD/WR) commands 252 and 254 in response to the requests REQ1 and REQ2. The read/write commands 252 and 254 are the long burst commands. Moreover, the long burst length BLy is twice the short burst length BLx, i.e., BLy=2*BLx.

In FIG. 4B, the burst length of the memory device 130 is set by the read/write commands 252 and 254. First, the read/write command 252 corresponding to the request REQ1 is issued to initiate a burst read/write operation for the bank group BG0 of the memory device 130, and the portion of data 251_1 of the bank group BG0 is transferred to or from the memory device 130 on successive clock cycles of the data clock WCK in the time interval tBLx. In other words, the portion of data 251_1 is transferred simultaneously with the read/write command 252. Furthermore, the clock cycles of the data clock WCK in the time interval tBLx is determined according to the short burst length BLx. In some embodiments, the clock cycles of the data clock WCK is 24. Seamlessly, the read/write command 254 corresponding to the request REQ2 is issued to initiate a burst read/write operation for the bank group BG1 of the memory device 130, and the portion of data 253_1 of the bank group BG1 is transferred to or from the memory device 130 on successive clock cycles of the data clock WCK in the time interval tBLx. In other words, the portion of data 253_1 is transferred simultaneously with the read/write command 254. Seamlessly, in response to the read/write command 252, the remainder of data 251_2 of the bank group BG0 is transferred to or from the memory device 130 on successive clock cycles of the data clock WCK in the time interval tBLx. Seamlessly, in response to the read/write command 254, the remainder of data 253_2 of the bank group BG1 is transferred to or from the memory device 130 on successive clock cycles of the data clock WCK in the time interval tBLx. In such embodiments, in response to each of the requests REQ1 and REQ2, the controller 120 is configured to only issue a single command (i.e., the long burst command 252 or 254) to the memory device 130, although multiple portions of data are sent separately. In other words, while the remainder of data 251_2 and the remainder of data 253_2 are transferred, no command is issued by the controller 120.

In FIG. 4B, the data of the bank group BG0 and the data of the bank group BG1 of the memory device 130 are transferred alternately, i.e., the data of the bank groups BG0 and BG1 are interleaved in the data DQ. In such embodiment, the data of the bank group BG0 is 32 bytes of data in the data DQ, and is divided into the first portion of data 251_1 and the second portion of data 251_2. Similarly, the data of the bank group BG1 is 32 bytes of data in the data DQ, and is divided into the first portion of data 253_1 and the second portion of data 253_2. Furthermore, the controller 120 is configured to control the data 251_1, 253_1, 251_2 and 253_2 are seamlessly transferred in sequence. Thus, the data bus efficiency of the data DQ is optimized when the read/write commands of different bank groups interleaved.

Figure 4C:
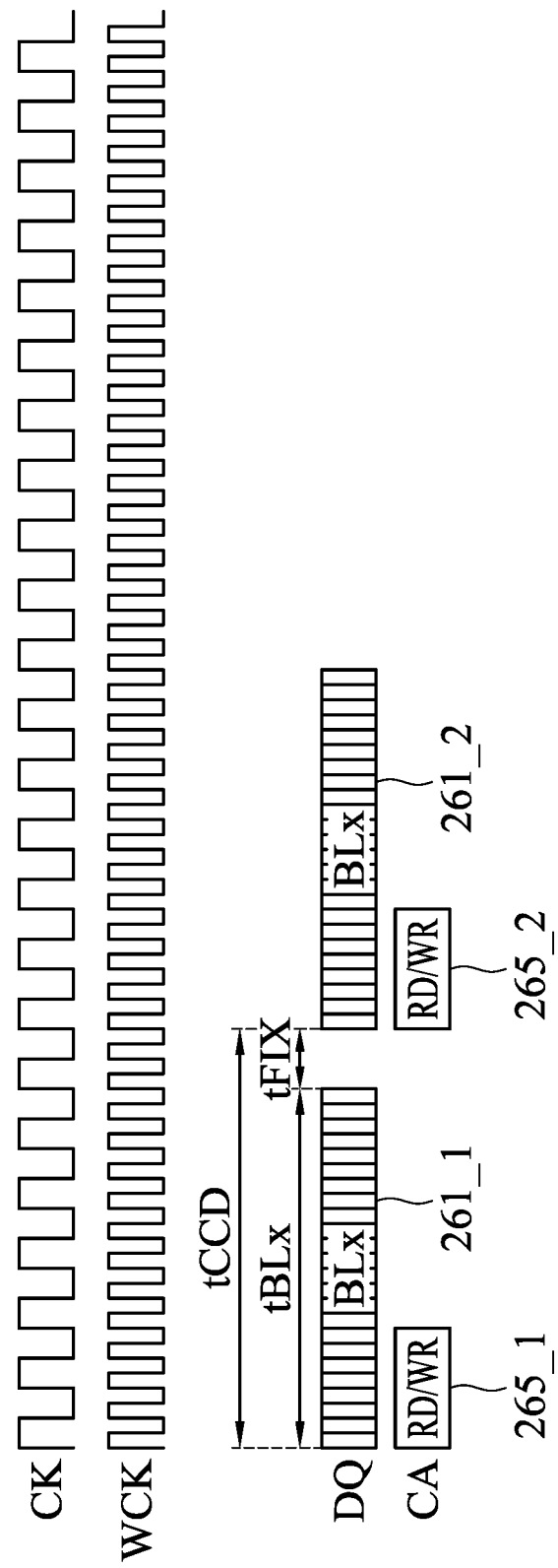
FIG. 4C shows a diagram illustrating the signals of the interconnect in the third burst mode according to some embodiments of the invention.

FIG. 4C shows a diagram illustrating the signals of the interconnect 175 in the third burst mode according to some embodiments of the invention. It is assumed that the controller 120 is configured to perform read/write operations in response to the request REQ2 in FIG. 2, and the requests REQ1 through REQn correspond to the same bank group BG2 of FIG. 2. When operating in the third burst mode, the controller 120 is configured to access the data of the memory device 130 with the short burst length BLx according to the read/write (RD/WR) commands 265_1 and 265_2 in response to the request REQ2. Furthermore, the read/write commands 265_1 and 265_2 are the short burst commands.

In FIG. 4C, the burst length of the memory device 130 is set by the read/write command 262. First, the read/write command 265_1 corresponding to the request REQ2 is issued to initiate a burst read/write operation for the bank group BG2 of the memory device 130, and the first portion of data 261_1 of the bank group BG2 is transferred to or from the memory device 130 on successive clock cycles of the data clock WCK in the time interval tBLx. Next, when a column-to-column or command-to-command delay time tCCD is reached, the read/write command 265_2 corresponding to the same request REQ2 is issued to initiate a burst read/write operation for the bank group BG2 of the memory device 130, and the second portion of data 261_2 of the bank group BG2 is transferred to or from the memory device 130 on successive clock cycles of the data clock WCK in the time interval tBLx.

The read/write commands 265_1 and 265_2 are reorganized to sequential addresses of the bank group BG2. The clock cycles of the data clock WCK in the time interval tBLx is determined according to the short burst length BLx. In some embodiments, the clock cycles of the data clock WCK is 24. In the third burst mode, in response to the request REQ2, the controller 120 is configured to separate one long burst command into two short burst commands (e.g., the read/write commands 265_1 and 265_2), and then continuously issue the two short burst commands to the memory device 130. In general, the delay time tCCD can be understood as the timing between consecutive access commands.

In FIG. 4C, the data of the bank group BG2 in the memory device 130 is transferred separately. In such embodiment, the data of the bank group BG2 is 32 bytes of data in the data DQ, and is divided into the first portion of data 261_1 and the second portion of data 261_2. Furthermore, the controller 120 is configured to transferred the data 261_1 and 251_2 in sequence according to the column-to-column or command-to-command delay time tCCD.

Compared with traditional method that uses traditional long burst length command to transfer the two portions of data with the short burst length BLx that are separated by a larger fixed time interval (e.g., the time interval tBLx), the second portion of the data corresponding to the second short burst command (e.g., the read/write command 265_2) is transferred more quickly because of smaller time interval (i.e., the fixed time interval tFIX is less than the time interval tBx). Therefore, the data bus efficiency of the data DQ is optimized.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An electronic system, comprising:
   a memory device, comprising a plurality of bank groups, wherein each of the bank groups comprises a plurality of memory banks; and
   a controller coupled to the memory device and configured to access the memory device with a data rate, and comprising:
   a request queue configured to store a plurality of requests,
   wherein when the requests correspond to the different bank groups, the controller is configured to access data of the memory device according to a plurality of long burst commands corresponding to the requests,
   wherein when the requests correspond to the same bank group, the controller is configured to access the data of the memory device according to a plurality of short burst commands corresponding to the requests,
   wherein the short burst commands correspond to a short burst length, and the long burst commands correspond to a long burst length that is twice the short burst length;
   wherein when the data rate is less than a specific data rate, the controller is configured to access the data of the memory device according to a third long burst command corresponding to one of the requests, wherein the data is transferred to or from the memory device on successive clock cycles of a data clock of the controller, and the number of the successive clock cycles is equal to the long burst length.

2. The electronic system as claimed in claim 1, wherein when the requests correspond to the same bank group, the controller is configured to reorganize a first long burst command corresponding to a first request of the requests as a first short burst command and a second short burst command.

3. The electronic system as claimed in claim 2, wherein in response to the first request, the controller is configured to transfer a portion of the data and a remainder of the data to or from the memory device according to the first and second short burst commands, respectively, and the controller is configured to issue the second short burst command when the first short burst command is issued and a column-to-column or command-to-command delay is reached.

4. The electronic system as claimed in claim 3, wherein the portion of the data is transferred to or from the memory device on first successive clock cycles of the data clock of the controller, and the remainder of the data is transferred to or from the memory device on second successive clock cycles of the data clock, wherein the number of the first successive clock cycles and the number of the second successive clock cycles are equal to the short burst length.

5. The electronic system as claimed in claim 1, wherein when the requests correspond to the different bank groups, the controller is configured to interleave a first long burst command corresponding to a first request of the requests and a second long burst command corresponding to a second request of the requests, so as to access first data of a first bank group of the bank groups and second data of a second bank group of the bank groups.

6. The electronic system as claimed in claim 5, wherein the controller is configured to control a portion of the first data, a portion of the second data, a remainder of the first data, and a remainder of the second data to sequentially and seamlessly transfer according to the first long burst command and the second long burst command.

7. The electronic system as claimed in claim 6, wherein the portion of the first data is transferred with the first long burst command, and the portion of the second data is transferred with the second long burst command.

8. The electronic system as claimed in claim 6, wherein during the remainder of the first data and the remainder of the second data are being transferred, no command is issued by the controller.

9. The electronic system as claimed in claim 6, wherein the portion of the first data is transferred to or from the memory device on first successive clock cycles of the data clock of the controller, and the portion of the second data is transferred to or from the memory device on second successive clock cycles of the data clock, wherein the number of the first successive clock cycles and the number of the second successive clock cycles are equal to the short burst length.

10. The electronic system as claimed in claim 9, wherein the remainder of the first data is transferred to or from the memory device on third successive clock cycles of the data clock, and the remainder of the second data is transferred to or from the memory device on fourth successive clock cycles of the data clock, wherein the number of the third successive clock cycles and the number of the fourth successive clock cycles are equal to the short burst length.

11. A method for controlling burst length to access a memory device in an electronic system, comprising:
    obtaining a plurality of requests stored in a request queue of the electronic system;
    determining whether the requests correspond to a plurality of bank groups of the memory device, wherein each of the bank groups comprises a plurality of memory banks;
    accessing data of the memory device according to a plurality of long burst commands corresponding to the requests when the requests correspond to the different bank groups; and
    accessing the data of the memory device according to a plurality of short burst commands corresponding to the request when the requests correspond to the same bank group, wherein the short burst commands correspond to a short burst length, and the long burst commands correspond to a long burst length that is twice the short burst length; and accessing the data of the memory device according to a third long burst command corresponding to one of the requests when the data rate is less than a specific data rate, wherein the data is transferred to or from the memory device on successive clock cycles of a data clock of the controller, and the number of the successive clock cycles is equal to the long burst length.

12. The method as claimed in claim 11, wherein accessing the data of the memory device according to the short burst commands corresponding to the request when the requests correspond to the same bank group further comprises:

reorganizing a first long burst command corresponding to a first request of the requests as a first short burst command and a second short burst command.

13. The method as claimed in claim 12, wherein accessing the data of the memory device according to the short burst commands corresponding to the request when the requests correspond to the same bank group further comprises:

in response to the first request, transferring a portion of the data and a remainder of the data to or from the memory device according to the first and second short burst commands, respectively; and issuing the second short burst command when the first short burst command is issued and a column-to-column or command-to-command delay is reached.

14. The method as claimed in claim 13, wherein the portion of the data is transferred to or from the memory device on first successive clock cycles of the data clock of the controller, and the remainder of the data is transferred to or from the memory device on second successive clock cycles of the data clock, wherein the number of the first successive clock cycles and the number of the second successive clock cycles are equal to the short burst length.

15. The method as claimed in claim 11, wherein accessing the data of the memory device according to the long burst commands corresponding to the requests when the requests correspond to the different bank groups further comprises:

interleaving a first long burst command corresponding to a first request of the requests and a second long burst command corresponding to a second request of the requests, so as to access first data of a first bank group of the bank groups and second data of a second bank group of the bank groups.

16. The method as claimed in claim 15, wherein a portion of the first data, a portion of the second data, a remainder of the first data, and a remainder of the second data are sequentially and seamlessly transferred according to the first long burst command and the second long burst command.

17. The method as claimed in claim 16, wherein the portion of the first data is transferred to or from the memory device on first successive clock cycles of a data clock of the controller, and the portion of the second data is transferred to or from the memory device on second successive clock cycles of the data clock, wherein the number of the first successive clock cycles and the number of the second successive clock cycles are equal to the short burst length.

18. The method as claimed in claim 17, wherein the remainder of the first data is transferred to or from the memory device on third successive clock cycles of the data clock, and the remainder of the second data is transferred to or from the memory device on fourth successive clock cycles of the data clock, wherein the number of the third successive clock cycles and the number of the fourth successive clock cycles are equal to the short burst length.

* * * * *